July 11, 1967 G. L. HOBROUGH ETAL 3,330,964
PHOTOELECTRIC COORDINATE MEASURING SYSTEM
Filed Sept. 9, 1963 4 Sheets-Sheet 3
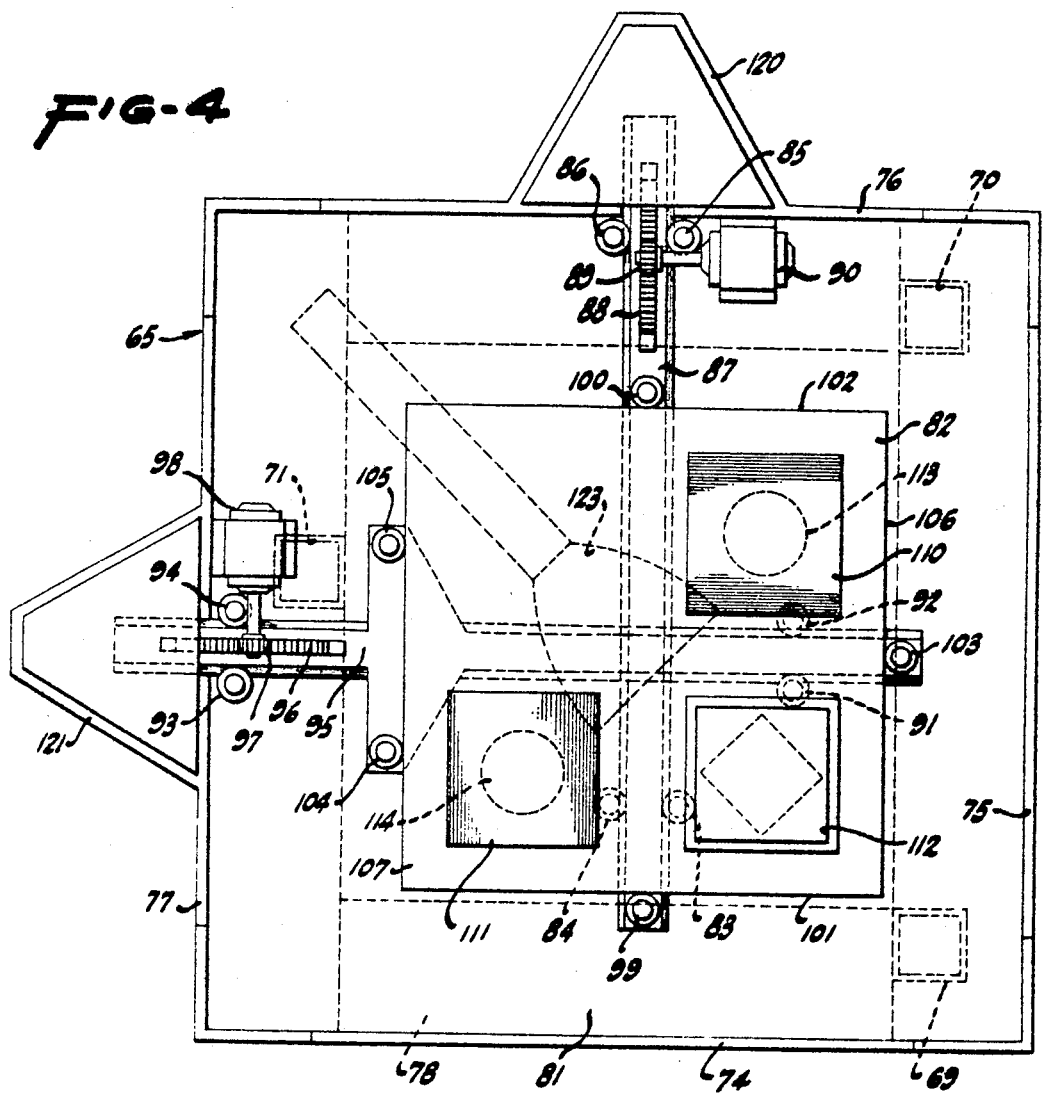
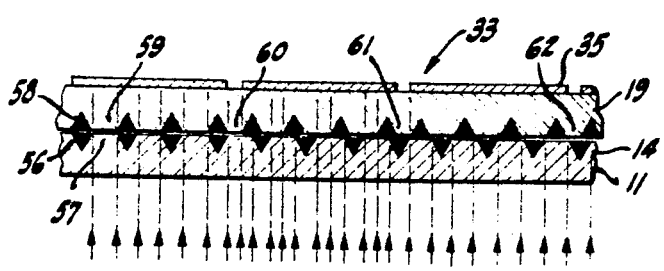
INVENTORS
GILBERT L. HOBROUGH
GEORGE A. WOOD
BY
Stanley Belsky
Bialos & Schlemmer
ATTORNEYS

United States Patent Office 3,330,964
Patented July 11, 1967

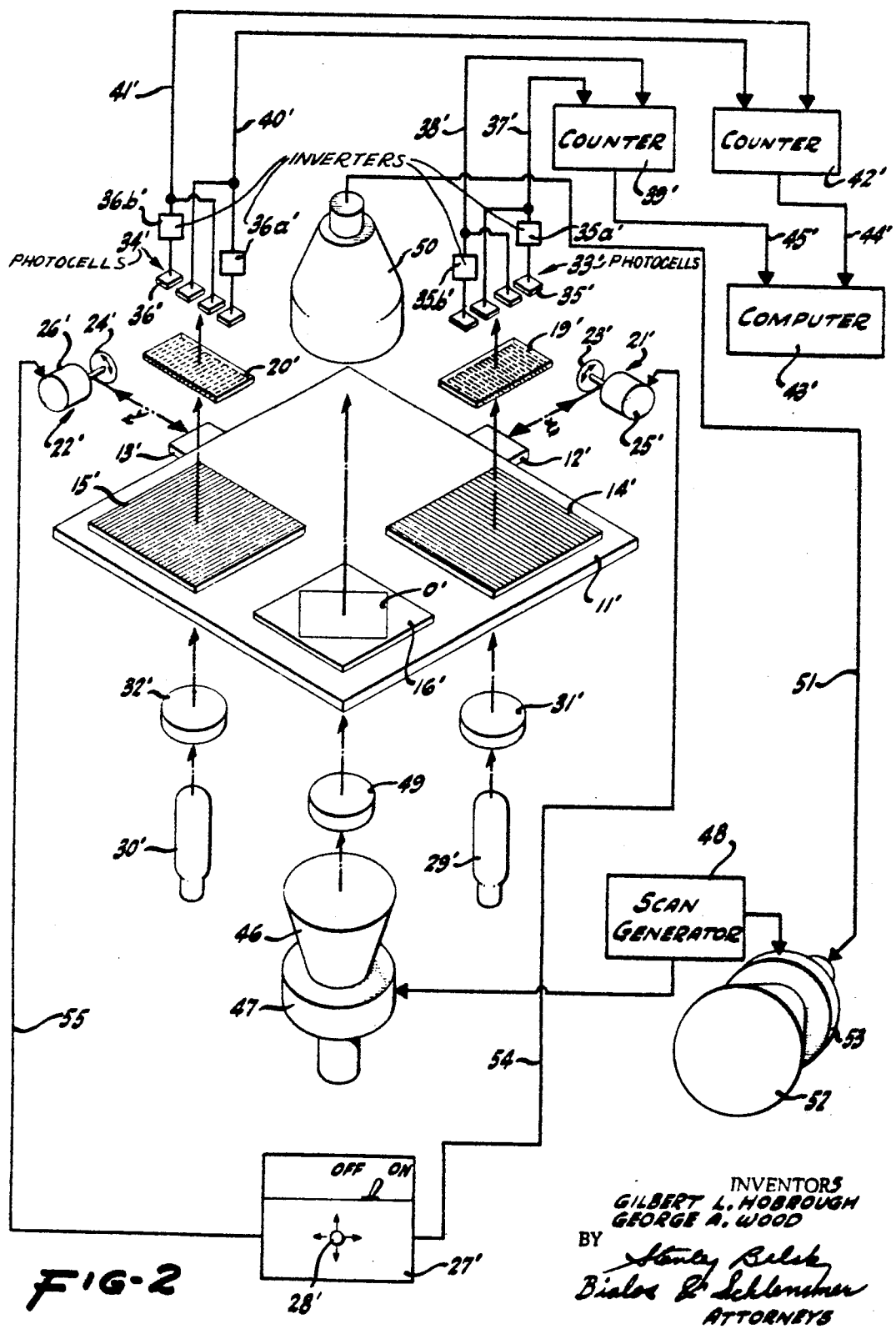

3,330,964
PHOTOELECTRIC COORDINATE MEASURING
SYSTEM
Gilbert L. Hobrough and George A. Wood, Los Altos,
Calif., assignors to Itek Corporation, Lexington, Mass.,
a corporation of Delaware
Filed Sept. 9, 1963, Ser. No. 307,441
21 Claims. (Cl. 250—237)

This invention relates to a coordinate measuring system and, more particularly, to a method of and apparatus for measuring or determining the relative Cartesian coordinates usually of two or more points on, in or along an object. Such object may be a three-dimensional solid, a planar representation thereof such as a drawing or photograph, or it may be of any other type—either opaque or transparent. By way of further example, and to indicate the range of applicability of the inventive system, such object can be a machine part having two or more points thereon the relative positions of which are required in Cartesian coordinate values for test or inspection purposes; it can be a hand-made model of which the shape or contour needs to be reduced to coordinate information for record purposes or to facilitate the preparation of drawings thereof (in the case of the object being either a machine part or model, pertinent coordinate information might be obtained for "digitizing" such object for automatic reproduction thereof by computer-controlled machines); or the object might be a photographic image having two or more points thereon which need to be coordinate-located for subsequent use.

The foregoing reference to locating the relative Cartesian coordinates of two or more points is meant to cover the general case in which the measuring system may have either a random origin or a fixed origin, it being appreciated that in the latter event it would be customary to locate all points with respect to such fixed origin. In that it is quite possible by simple mathematical operations to change coordinate systems or to convert from one system to another, it is common in many environments to locate two or more points relative to each other in Cartesian coordinate values rather than locate such points relative to a fixed origin. Photogrammetry is an example of an environment in which the relative coordinates of two or more points are usually determined rather than the coordinates thereof with respect to a fixed origin. The present invention is especially useful in this field.

Coordinate measuring systems exist in the art and many are well known. Mostly, such systems have been unsatisfactory where accuracy is a requisite as, for example, in photogrammetric mapping where the geometric fidelity of such maps is directly (although not exclusively) dependent upon the accuracy of the coordinate determinations of the image points in each photograph. Additionally, rapid determination of such point coordinates by prior measuring systems, which is becoming a critical necessity because of the quantity of photographic information being processed, has not been practicable because speed and accuracy have been incompatible functions, and accuracy could not be sacrificed to obtain higher measuring speeds.

One of the primary reasons for such inaccuracy in prior systems is that they are dependent upon and are limited by mechanical mechanisms in that the coordinate determinations are made through lead screws, drive gears, etc., wherein the often aggregative tolerances of current manufacturing techniques are substantially greater than the measuring tolerances permissible for accurate point location in a photograph. Moreover, in such systems there is a disassociation of the x and y measuring scales, which results in considerable difficulty in adjusting and maintaining proper alignment not only of the scales but of the system generally; and since such alignment is critical, vibration, temperature, wear and various mechanical problems tend to degrade the measuring accuracy very quickly.

Further, disassociation of the measuring scales, and the necessity of displacing at least certain components of the system along each such scale in order to locate point coordinates, means that the two separate drive mechanisms necessarily employed to effect such independent displacements must move components of different mass which usually results in the displacements being discontinuous especially where the displacements are manually controlled and induced. Even where servodrives are used to effect displacements, such undesirable discontinuous motion is not avoided although it is somewhat reduced thereby. However, the two servodrives must be different in power output because the masses respectively displaced thereby are different, but they must have the same response—a difficult combination to achieve.

Additionally, the use of different materials, which is quite common and often required in the fabrication of prior coordinate measuring systems, makes such systems highly sensitive to changes in ambient temperature, which then alters the response characteristics of the system. Where lead screws are employed, the development of heat from friction changes the response and accuracy of such systems when measurement determinations are being made in small units such as microns.

It is, accordingly, an object of the present invention to provide an improved coordinate measuring system in which both accuracy and speed of operation and motion are attainable characteristics. Another object of the invention is in the provision of a coordinate measuring system in which mechanical inaccuracies are minimized and substantially obviated by effectively confining the same to a single solid transport member which can then be displaced, for coordinate-locating purposes, by devices which need not be precision-built components since the accuracy of the coordinate determinations is not dependent thereon.

Still another object is that of providing an improved coordinate measuring system of the type described, in which a plurality of measuring scales, such as ruled gratings, are used in determining point coordinates—such scales being fixedly interrelated and bodily transportable for making coordinate measurements, which arrangement results in the separation of the heretofore incompatible functions of measuring accuracy and speed (that is, rapid transport). A further object is to provide a system of the character described in which the position of the object is so located with respect to the measuring scales or gratings that the sensitivity of the system to rotation-induced errors is substantially obviated—such errors being limited to the favorable cosine function.

Yet a further object is in the provision of both measuring and reference scales in the form of ruled transparent gratings, fractional pitch faults being introduced between apertures of certain of such gratings to obtain direction of motion information along each measuring axis. Additional objects and advantages of the invention will become apparent as the specification develops.

Embodiments of the invention are illustrated in the accompanying drawings, in which—

FIGURE 2 is a diagrammatic perspective view depicting a modified form of system;

FIGURE 3 is a greatly enlarged, broken end view in elevation in somewhat diagrammatic form illustrating the interrelationship of the measuring and reference gratings and photo transducers used in the system;

FIGURE 4 is a top plan view of apparatus embodying the invention—the cover or light shield and components carried thereby being removed.

Figure 1:
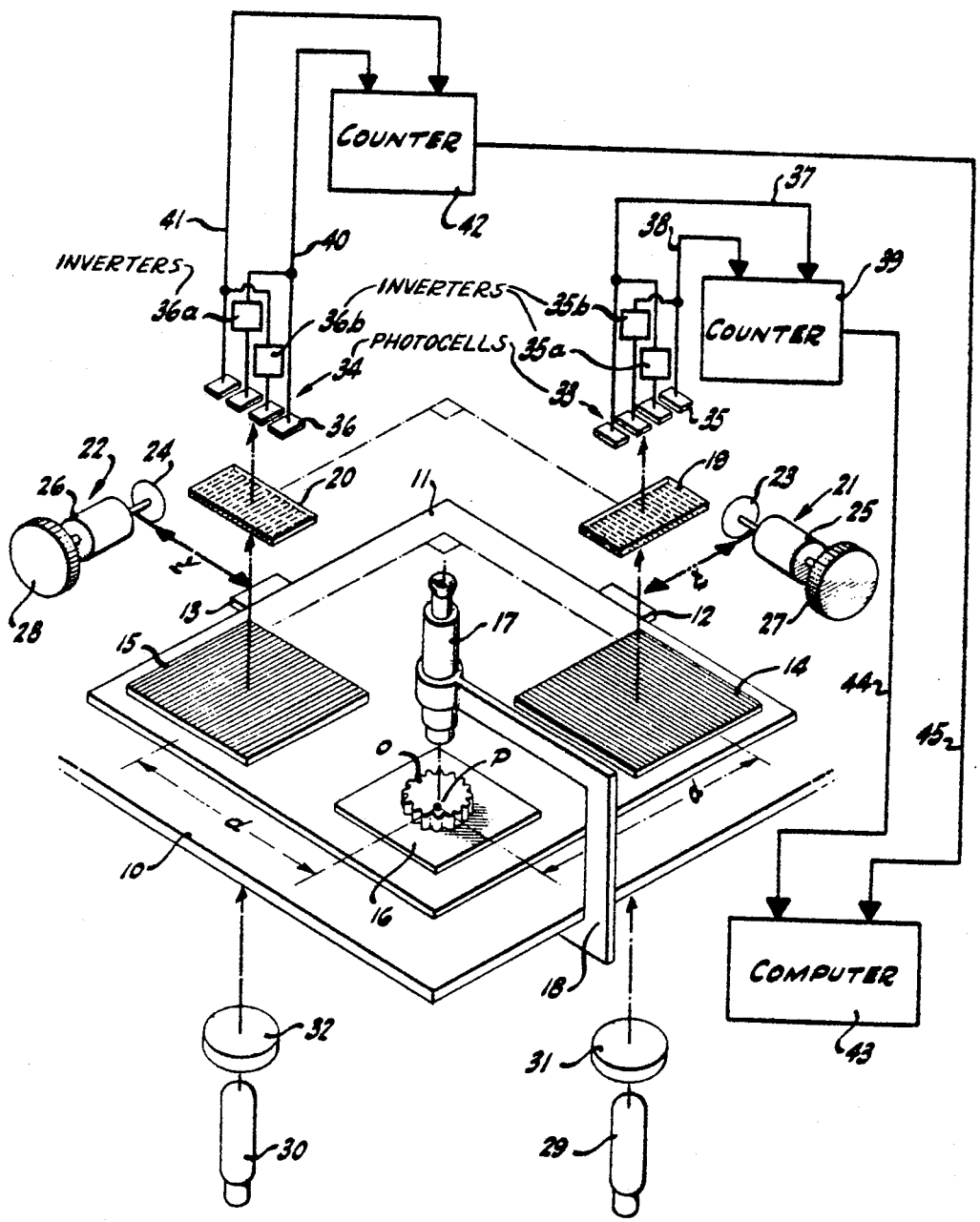
FIGURE 1 is a diagrammatic perspective view depicting one form of the system.
Figure 5:
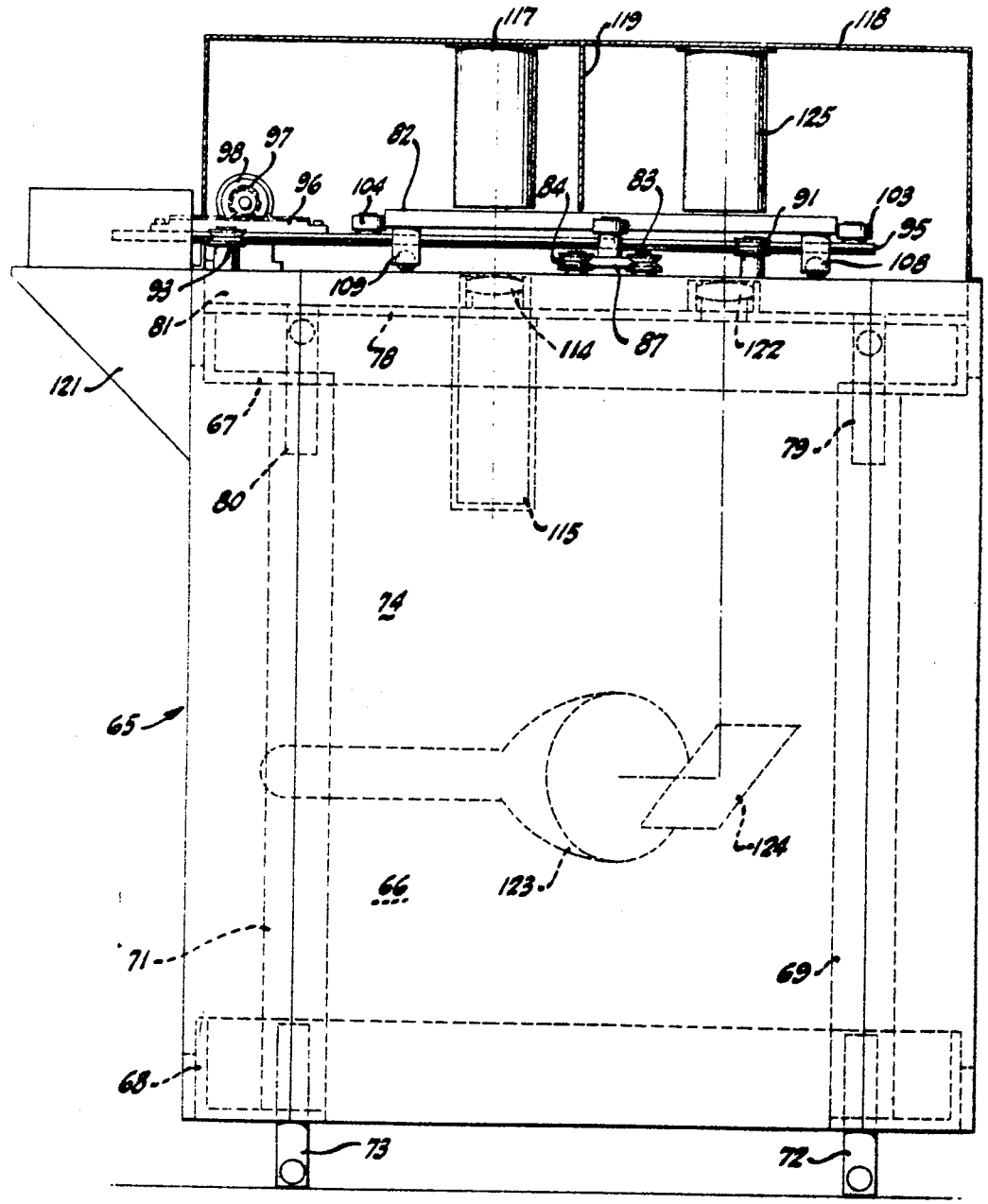
FIGURE 5 is a side view in elevation of the apparatus with certain portions thereof being broken away and shown in section.

The coordination measuring system diagrammatically illustrated in FIGURE 1 includes a stationary platform or support 10 and a movable transport plate 11 reciprocably displaceable with respect to the platform. The transport 11 is a rigid, generally planar unitary structure (which, for example, may be a plate of glass), and operatively arranged therewith, as described subsequently in connection with FIGURES 4 and 5, are drive means 12 and 13 disposed substantially at right angles with respect to each other and substantially paralleling the $x$ and $y$ coordinate axes respectively defined by a pair of measuring scales 14 and 15 rigidly carried by the transport 11. The measuring scales 14 and 15, in the form shown, are ruled transparent gratings, desirably of glass, and assuming the $x$ and $y$ axes to have their origin at about the center of the transport 11, the scales 14 and 15 are respectively disposed in the $+x, -y$ and $-x, +y$ quadrants of the thusly formed Cartesian coordinate system. Additionally, the elongated apertures of the gratings 14 and 15 are disposed at right angles with respect to each other and intersect in the $+x, +y$ quadrant. In the particular orientation illustrated, such apertures of the grating 14 extend normal to the $x$ coordinate axis, and those of the grating 15 extend normal to the $y$ coordinate axis; and, as shown in FIGURE 1, the axes of the gratings (or the apertures) are normal to each and projections thereof would intersect at right angles.

Disposed upon the transport 11 is an inspection station generally designated with the numeral 16, and positioned thereat is an object O. The inspection station 16 is located in the $-x, -y$ quadrant of the coordinate measuring system; and it may be noted that such disposition of the inspection station is advantageous, whence the reasons therefor will be considered in detail hereinafter. Adjacent the inspection station 16 in general alignment therewith are means for viewing or inspecting the object O; and in the particular embodiment illustrated in FIGURE 1, inspection is to be performed visually as by means of a microscope 17 supported by a bracket 18 connected at one end thereto and rigidly related at its other end to the stationary platform 10. The microscope 17 may be equipped with the usual reticle or centering line system so that any selected point on the object O can be accurately centered with respect to the microscope.

Respectively disposed above the measuring scales 14 and 15 are fixedly located reference scales 19 and 20 in the form of ruled glass gratings. The elongated apertures of the gratings 19 and 20 are disposed at right angles with respect to each other and in parallel alignment with those of the respective gratings 14 and 15; and, therefore, such apertures of the grating 19 extend normal to the $x$ coordinate axis, and those of the grating 20 extend normal to the $y$ coordinate axis. Extensions of the reference grating apertures would intersect at right angles, as shown in FIGURE 1. In practice, the reference gratings 19 and 20 will be disposed in very close proximity to the respectively associated measuring gratings 14 and 15 so as to minimize the presence of stray light therebetween, and only sufficient clearance need be provided to permit displacement of the transport 11 and measuring scales 14 and 15 along the $x$ and $y$ axes relative to the reference gratings 19 and 20.

The transport 11 and measuring scales carried thereby are adjustably displaced relative to the reference scales 19 and 20 by any suitable means which includes provision for substantially parallel guidance. The manual drive structures 21 and 22 illustrated are shown to respectively comprise rotatable drive elements 23 and 24 operatively coupled with the drive means 12 and 13. The drive structures may also comprise gear reducers 25 and 26 which respectively rotate the elements 23 and 24 in response to adjustments of hand wheels 27 and 28. Displacements of the transport 11 are read or measured in accordance with changes, caused by such displacements, in light energy emanating from fixedly located light sources 29 and 30—the light from which is respectively directed through collimating lenses 31 and 32 and through the respectively associated scales 14–19 and 15–20 in alignment therewith and toward transducer units 33 and 34 which respectively comprise a plurality of individual photo transducers 35 and 36.

The four photo transducers 35 are alternately arranged into two pairs, and the algebraic output provided by the transducers of one pair is connected to a lead 37 (an inverter 35a being interposed between one of the transducers and its point of connection to the lead 37 to invert the output of that transducer), and the output of the other pair of transducers is connected to a lead 38 (an inverter 35b being connected with one of the transducers of such pair). Both of the leads 37 and 38 are connected to a counter 39. Similarly, the four photo transducers 36 are alternately arranged into two pairs, and the algebraic outputs of such two pairs are respectively connected by leads 40 and 41 to a counter 42 (inverters 36a and 36b being respectively connected to one transducer of each pair). Depending upon the type of counters employed and the use intended for the information provided thereby, the outputs of such counters 39 and 42 may be fed to a computer 43.

All of the photo transducers 35 and 36 may be of any suitable commercially available type as, for example, photo-resistance cells—the current outputs of which are directly proportional to the quantity of light incident thereon, such as the devices sold by the Clairex Corporation as Photoconductive Cells. The counters 39 and 42 may be commercially available megacycle counters capable of handling translational displacements of the transport 11 in the order of 10 centimeters per second, for example, which in the particular system under consideration will yield a count rate of approximately $1 \times 10^6$ counts per second. Typical counters of this type tally the individual count pulses and carry the contemporary total, which may be sampled in various ways, e.g., visual display, tape recording, punched tapes or cards, etc. An exemplary counter which may be used in the system is Reversing Counter sold by Beckman Instruments Corp. The information or outputs provided by the counters 39 and 42 might be fed directly to a utilization device such as a computer through leads 44 and 45, or recorded, stored and thereafter used as, for example, where the coordinate information is "digitized."

A typical measuring grating used in the system may be a land and groove grating and, as shown in FIGURE 3, may have a plurality of opaque or light-reflecting areas 56 of substantially equal widths uniformly spaced from each other to define light-transmitting apertures 57 therebetween. In such typical grating, the opaque areas 56 are two microns in width, and each aperture 57 is also two microns wide. Thus, the basic counting cycle defined by such grating has a width of four microns, which comprises the sum of the widths of one opaque area 56 and one aperture 57.

The reference gratings may be formed in the same manner as the measuring gratings, and each reference grating is mounted in some appropriate manner, such as described hereinafter in connection with the structure illustrated in FIGURES 4 and 5, in slightly spaced relation with the transport 11 so as to permit free relative movement therebetween. The reference gratings, therefore, comprise a plurality of opaque or light-reflecting areas 58 of substantially equal widths, and for the most part such areas are uniformly spaced from each other to define light-transmitting apertures 59 therebetween. It will be noted that each reference grating is provided therealong with ¼-pitch faults or offsets as indicated at 60, 61 and 62—the purpose of which is described subsequently.

In a typical construction, the various photo transducers 35 may be adhesively secured or otherwise bonded to the reference grating 19 and actually provide a support therefor. In the specific illustration, four individual photo transducers 35 are employed to form the transducer unit 33, and it will be appreciated that each transducer 35, although a relatively narrow component, may span several hundred apertures; and, therefore, the illustration of FIGURE 3 has been highly distorted in a dimensional sense for the purpose of clarity of detail.

By way of indicating the relative sizes of the measuring grating, reference grating and transducer units in a typical installation, each measuring grating may be a 10″ square, each reference grating may be a rectangle 1″ x ¼″ (the larger dimension being along or in the direction of the associated coordinate axis), and each of the transducer units (33, for example) may have an over-all dimension of ¼″ x ¼″. Although these specific dimensions are given by way of example and are not critical, it is, quite evidently, necessary to have the measuring gratings sufficiently large that the maximum displacement of the transport 11 in either direction along the $x$ and $y$ axes will not cause portions of the reference gratings to extend beyond the dimensional limits of the measuring gratings or, stated another way, the dimensions of each measuring scale or grating should be greater, by any amount desired to obviate the necessity of accurately locating the object at the inspection station, than the object size plus the length of the associated reference scale or grating.

In practice, the measuring grating 14 may be formed integrally with the transport 11, particularly where the transport is a plate of glass or similar light-transmitting material. In such event, the grating masters may be produced on a diffraction grating ruling machine, the entire ruled surface metallized, and the plate thereafter polished to remove the unwanted metal coating. Then, photographic reproduction techniques may be employed to produce a duplicate of such master on the transport itself.

Forming the measuring gratings 14 and 15 integrally with the transport 11 has the advantage of rigidly fixing and maintaining the axes of such gratings in a predetermined relation with respect to each other. To obtain accuracy of coordinate determinations in a Cartesian coordinate system, it is necessary that the axes of such gratings be at right angles with respect to each other; and, therefore, once this relationship is established, it is thereafter maintained where the measuring gratings are integrally formed with the unitary transport. Additionally, such a construction substantially obviates measuring errors that might otherwise be caused by temperature changes, and errors that might result from necessary manufacturing tolerances in fabricating a number of separate components and which could be additive.

In use of the system shown in FIGURE 1, an object O is positioned at the inspection station 16 and, as heretofore stated, the object O may be of any type and have any configuration. Therefore, it may be a three-dimensional opaque solid such as the gear illustrated in FIGURE 1, or it might be a transparent object such as a photographic transparency. The requirements concerning any such object might be to locate the coordinates of one or more points in or on the object; it might be to determine the precise configuration thereof, in which event the coordinates of a sufficient number of points along the edge portion or periphery of the object would have to be located so that the information obtained would constitute, in effect, a continuous plotting of the periphery; or some other information involving coordinates might be required. Ordinarily, it will be advantageous to illuminate the object O in some manner for visual inspection thereof; and in the case of the object being opaque, it will usually be front-lighted by a suitable light source (not shown). If the object is transparent, it may be rear-lighted.

Usually, shields will be placed about the light and lens systems 29-31 and 30-32 and also about the respectively associated grating and photo transducer compositions, but such shields have been omitted in FIGURE 1 so as to simplify and clarify the illustration. Additionally, the transport 11, if it is a transparent component, may be painted or otherwise coated to make the same opaque except at the measuring gratings 14 and 15 thereof and at the inspection station 16 if back-lighting of the object O is employed.

In certain instances it may be desired to have the object O positioned so that the geometric center thereof is aligned with the reticle of the microscope 17 when the transport 11 is in a position such that the coordinates of the geometric center of the object are $x=0$ and $y=0$. However, any $x$, $y$ starting position of the transport 11 may be taken to be the origin for any set of measurements, and the point coordinates are then measured or determined with respect thereto. Consequently, precise positioning of the object O relative to a predetermined centered position of the transport 11 is usually not critical.

Assuming the coordinates of a particular point on the object O are to be determined, an operator appropriately displaces the transport 11 to bring such point into alignment with the reticle of the microscope 17, and the translational displacement or displacements of the transport necessary to effect such alignment cause changes in the amount of light incident on the transducer unit 33 and/or 34, with the result that the current output of the affected transducer unit pulses at the rate of four pulses for each cycle of aperture displacement (four microns in accordance with the prior described specific example), and such pulses are either read out at the counters as information of some selected type and/or the information is fed to an accumulator or add-subtract register or computer 43, as the case may be. This procedure is repeated for each point at which the $x$, $y$ coordinates are to be determined.

The individual cells 35 of the transducer unit 33 and cells 36 of the transducer unit 34 are arranged in alternate pairs or groups for the purpose of giving sense or direction to the displacements of the transport 11 rather than just the magnitudes of the displacements. That is to say, the direction of displacement of the transport 11 in both the negative and positive directions along the $x$ axis and also along the $y$ axis is automatically ascertained because of such groupings, as is the magnitude or amount of each such displacement. More particularly, at least two individual cells are necessarily employed in each transducer unit in order to provide sense or direction to displacements of the transport 11 along the coordinate axis associated with such transducer unit. The two cells, because of the ¼-pitch faults in the reference gratings, produce current outputs that are 90° out of phase; and when the outputs are then fed to appropriate logic circuitry, which is customarily provided with counters of the type referred to hereinbefore, an indication is obtained not only of the extent of each displacement of the transport but also of the direction of such displacement. Although two cells provide a sufficient number for indicating direction of movement, as heretofore explained, a greater plurality of cells is desirably employed to define each transducer unit (such as the four cells illustrated) so as to provide an average of the light intensity across at least a substantial portion of the reference grating. This averaging of the incident light minimizes the influence of local disturbances or localized effects. Evidently, such greater number of cells will be arranged in two groups—each of which in the case of four cells comprises a pair.

The illustrated positional relationship in which the measuring scales are located in the $+x$, $-y$ and $-x$, $+y$ quadrants and the inspection station is located in the $-x$, $-y$ quadrant is exceedingly advantageous in that it substantially obviates errors which might otherwise be introduced into the coordinate measurements as a consequence of any rotational tendency of the transport 11. In further explanation of this relationship, if the distance between any point P (see FIGURE 1) to be measured and the corresponding position point on each measuring grating is equal to the dimension $d$, and if the smallest measuring unit defined by the system is $\Delta d$ (one micron in accordance with the aforementioned specific example), then the angular tolerance T for rotational errors is described by the equation $$T = \pm \cos^{-1}\left[1 - \frac{\Delta d}{d}\right]$$

Therefore, the sensitivity of the system to rotation-induced errors is held to the favorable cosine character. Evidently then, the system will function if the inspection station is located in the $+x$, $+y$ quadrant or at any other position along the transport, but greater precision, then, will be required in constraining the transport against rotational tendencies if the same degree of accuracy is to be attained as that attributable to the described positional relationship.

It is evident that the coordinate measuring system illustrated in FIGURE 1 and described in connection therewith provides a number of important advantages, among which are (a) the provision and accurate maintenance of a predetermined relation of the graduations or aperture axes of one measuring scale with respect to those of the other which, in the case of a Cartesian coordinate system, is an orthogonal disposition of the graduations or aperture axes so that projections of such graduations or axes meet at right angles; (b) the provision of measuring scales substantially greater in dimensions than the object size so that there is no precise criticality inherent in the placement of the object O at the inspection station; (c) location of the inspection station in a particular quadrant or orientation with respect to the scales so that sensitivity of the system to rotation-induced errors is held to the cosine character; and (d) because of the unitary coupling of both of the measuring scales, there is no relative motion therebetween and a simplified motion displaces both scales simultaneously in measuring the relative location of two points on the object.

The modified system shown in FIGURE 2 is generally similar to the system of FIGURE 1, and differs therefrom only with respect to the object inspection means and means for energizing translational displacements of the transport. Accordingly, the system shown in FIGURE 2 includes a transport 11' (the support platform being omitted for purposes of simplifying the illustration), drive means 12' and 13', measuring gratings 14' and 15', an inspection station 16' having an object O' thereon depicting a photographic transparency, reference gratings 19' and 20', light sources 29' and 30', collimating lenses 31' and 32', photo transducer units 33' and 34', leads 37' and 38' connecting the transducer unit 33' to a counter 39' (inverters 35a' and 35b' being included in the transducer network as heretofore described), leads 40' and 41', connecting the transducer unit 34' to the counter 42' (inverters 36a' and 36b' being included as in the embodiment of FIGURE 1), and a computer 43' connected by leads 44' and 45' to the counters 39' and 42'. All of the foregoing components are interrelated in the same manner as their counterparts in the system of FIGURE 1.

The arrangement disclosed in the embodiment of FIGURE 2 for inspecting the object O' at the inspection station 16' includes a flying spot scanner or CRT 46 having a deflection yoke 47 energized by a scan generator 48. The scanning beam from the CRT 46 is directed by a focusing lens 49 through the inspection station 16' and toward a photo multiplier pick-up tube 50, the output of which is fed through a lead 51 to the input of a viewing CRT 52 having a deflection yoke 53 energized by the scan generator 48. The viewing CRT defines a monitor station, and also located thereat is an electrical control unit 27' having a master on-off switch and also a universally articulated switch control 28' by means of which motors 25' and 26' are respectively energized through leads 54 and 55. The motors 25' and 26' are comprised by drive units 21' and 22', and they respectively rotate drive elements 23' and 24' which are operatively related to the rack gears 12' and 13'.

The operation of the system illustrated in FIGURE 2 is the same as that of FIGURE 1, except that the object O' is visually inspected at a monitor station by means of the viewing CRT 52, which may have a reticle on the face thereof for alignment purposes. In the particular illustration of FIGURE 2, the object O' is a transparent photographic plate which is scanned by the beam from the flying spot scanner 46. The light passing through such object scanned by the beam is collected by the photo multiplier tube 50, and the output thereof is fed to the viewing tube 52.

In order to align a selected point on the object O' so as to determine the coordinates thereof, the operator appropriately displaces the transport 11' by energizing one or both of the reversible motors 25' and 26' in the proper direction. Such energization is accomplished by suitably manipulating the articulated switch lever 28'. Thus, if it is necessary to displace the transport 11' in a positive sense along the $x$ axis, the lever 28' may be moved toward the right, it is moved in the opposite direction to displace the transport in a negative sense along the $x$ axis, and it is moved either up or down to respectively displace the transport in the positive and negative directions along the $y$ axis. Quite evidently, four combinations of displacements along the $x$ and $y$ axes can be obtained by displacing the lever 28' into the quadrants defined between the arrow-equipped lines on the face of the control unit 27', and movement in either the $x$ or $y$ sense may dominate depending upon the exact position of such lever. The energizing circuits of the motors 25' and 26' may be interrupted by means of the main on-off switch, which by appropriate circuitry (not shown) may also effect de-energization of the lights 29' and 30' as well as the other electrically energized components of the system.

An exemplary structural embodiment of the invention is illustrated in FIGURES 4 and 5, and such structure includes a casing 65 defining a compartment 66 therein, and comprises upper and lower perimetric frame elements 67 and 68 (each of which is in the form of generally L-shaped channels) and a plurality of vertically oriented struts extending between and rigidly connected to such frame elements. In the specific structure shown there are three such struts which, for identification, are respectively denoted with the numerals 69, 70 and 71. Each of the struts is equipped at the lower end thereof with a tapped opening that threadedly receives a foot or leg therein—there being two such feet illustrated in FIGURE 5, respectively denoted with the numerals 72 and 73. Thus, a tripod or three-point support is provided for the casing 65, and the feet can be adjustably positioned to level the structure.

The casing 65 is further provided with side walls 74, 75, 76 and 77, at least one of which should be removable so as to provide access to the compartment 66. Interiorly of the side walls adjacent the upper end thereof is a support element 78 that seats upon the upwardly extending webs of the upper frame element 67, and the support element may be fixed against translational displacements in a horizontal plane by a plurality of pins that extend downwardly into the vertical struts 69, 70 and 71 (two such pins 79 and 80 being shown in FIGURE 5). The support element 78 is in the form of a perimetric frame having a large, generally square-shaped opening therethrough, and seated upon the support element is a horizontally disposed, generally planar platform 81.

The platform 81 is provided with two tracks or guideways that operate to constrain a transport table or plate 82 for translational displacements along x and y coordinate axes evidently normal to each other. The guideway constraining the transport 82 for translational displacements along the x axis is defined by two pairs of spaced apart rollers 83–84 and 85–86, each of which is rotatably supported upon a post rigidly anchored to the platform 81 and extending upwardly from the upper surface thereof. Supported by such rollers for reciprocable displacements along the x axis is an elongated guide 87 equipped adjacent one end thereof with a rack gear 88, the teeth of which are in meshing engagement with a drive gear 89 mounted upon the shaft of a reversible motor 90. Consequently, rotation of the motor 90 in either direction will cause the elongated guide 87 to be accordingly displaced along the x axis; and as is best seen in FIGURE 5 each of the rollers 83 through 86 has a V-shaped track along the circumferential surface thereof which receives therein the correspondingly V-shaped edge portions of the guide 87.

The guideway constraining the transport 82 for translational displacements along the y axis is defined by two pairs of spaced apart rollers 91–92 and 93–94, each of which is rotatably supported upon a post rigidly anchored to the platform 81 and extending upwardly from the upper surface thereof. Supported by such rollers for reciprocable displacements along the y axis is an elongated guide 95 equipped adjacent one end thereof with a rack gear 96, the teeth of which are in meshing engagement with a drive gear 97 mounted upon the shaft of a reversible motor 98. Consequently, rotation of the motor 98 in either direction will cause the elongated guide 95 to be accordingly displaced along the y axis; and as is best seen in FIGURE 5, each of the rollers 91 through 94 has a V-shaped track along the circumferential surface thereof which receives therein the correspondingly V-shaped edge portions of the guide 95.

The guide 87 has a pair of axially spaced rollers 99 and 100 extending upwardly therefrom which frictionally engage the transport 82 along the respective edges 101 and 102 thereof. In a generally similar manner, the guide 95 is equipped with a plurality of rollers 103, 104 and 105 extending upwardly above the plane thereof for frictional engagement with the transport 82 along its edge portions 106 and 107. The rollers 103 through 105 are arranged so as to define a three-point engagement with the transport 82; and accordingly, the roller 103 engages the edge 106 of the transport while the rollers 104 and 105 (which are spaced from the roller 103 along the y axis) are separated from each other along the x axis and engage the edge 107 at spaced locations therealong. The rollers 99 and 103 are spring loaded into engagement with the associated edges of the transport 82, and as shown in FIGURE 4, the guide 95 is enlarged adjacent the rollers 104 and 105 so as to provide a relatively large spacing therebetween.

The transport 82 may be equipped with a plurality of depending supports, there preferably being four in number, such as the supports 108 and 109 shown in FIGURE 5. Such supports stabilize the transport in a vertical sense and suitably engage the upper surface of the platform 81 so as to support the transport for displacements relative thereto. Friction-reducing means are employed to interrelate the upper surface of the platform 81 and the supports 108 and 109 which, for example, may be wheel- or ball-equipped casters as shown. The guide 87 is located below the guide 95 so that interference therebetween is avoided during displacements of the transport.

The transport 82 is constrained against movements relative to the guide 87 in the positive direction along the x axis by the roller 100 and in the negative direction along such axis by the roller 99; and the transport is similarly constrained against movements relative to the guide 95 in the positive direction along the y axis by the rollers 104 and 105 and in the negative direction along such axis by the roller 103. Furthermore, the transport is constrained against rotational tendencies with respect to the guide 95 by the rollers 103, 104 and 105, and in particular the latter two which engage the transport along the same edge 107 thereof.

If the motor 90 is energized, the gear 89 will rotate and thereby displace the guide 87 along the x axis because of the meshing engagement of the gear 89 with the rack gear 88 carried by the guide 87. As a result, the rollers 99 and 100 will be displaced with the guide 87 since they are carried thereby, and the transport 82 will necessarily be displaced because it is frictionally gripped by the rollers 99 and 100. The resulting displacement is accommodated by the rollers 103, 104 and 105 because the edges 106 and 107 of the transport move tangentially with respect to such rollers along the path described by rotational movement thereof. If the motor 98 is energized, the gear 97 will rotate and thereby displace the guide 95 along the y axis because of the meshing engagement of the gear 97 with the rack gear 96 carried by the guide 95. As a result, the rollers 103, 104 and 105 will be displaced with the guide 95 since they are carried thereby, and the transport 82 will necessarily be displaced because it is frictionally gripped by such rollers. The resulting displacement is accommodated by the rollers 103, 104 and 105 because the edges 101 and 102 of the transport move tangentially with respect to such rollers along the path described by rotational movement thereof. Therefore, the transport 82 may be adjustably moved in either direction along both the x axis and y axis, and it can be appropriately moved at the same time along each of the axes by proper energization of the motors 90 and 98.

As described hereinbefore, the transport 82 may be an integral glass plate equipped with measuring scales in the form of gratings 110 and 111 respectively oriented in the $+x, -y$ and $-x +y$ quadrants of the coordinate measuring system. The transport 82 is also equipped with an inspection station 112 located in the $-x, -y$ quadrant, and positioned at such station is an object illustrated by broken lines. Respectively disposed below the gratings 110 and 111 are collimating lenses 113 and 114—the lens 114 being shown in FIGURE 5 in association with a light shield or container 115 which will have a suitable light source located therein (the lens 113 and associated light shield and light source being omitted in FIGURE 5 for purposes of clarity).

Respectively disposed above the gratings 110 and 111 are a pair of enclosure structures—one of which (denoted with the numeral 117) is shown in FIGURE 5—secured to and carried by a removable cover 118 that forms a light shield over and about the transport 82 and associated equipment located at the upper end of the casing 65. The cover 118 may be equipped with one or more depending dividers 119 extending downwardly toward the transport 82 to form light shields preferably separating the gratings 110 and 111 and their associated components from each other and also from the inspection station 112. The enclosure structures are respectively equipped with reference gratings and with photo transducer units, as heretofore described, and provide a mounting and support means therefor.

If desired, the casing 65 may be equipped with guards 120 and 121 which project outwardly from the respectively associated side walls 76 and 77 thereof to physically protect the corresponding end portions of the guides 87 and 95 which may at times extend outwardly beyond such side walls of the casing during the determination of certain point coordinates on an object being inspected.

The platform 81 is appropriately provided with openings aligned with the collimating lenses 113 and 114 so that light passing therethrough can be directed upwardly toward and through the measuring gratings 110 and 111, and the containers associated with such lenses may be secured to and carried by the platform in any suitable manner, such as by means of releasable fastener structures. The platform is also provided with an opening in general alignment with the inspection station 112, and mounted therein is a lens 122 used for focusing the beam from a flying spot scanner 123 through the inspection station. In the structure specifically illustrated, the flying spot scanner 123 is horizontally disposed within the compartment 66 of the casing 65; and a plane mirror 124 is angularly mounted within such compartment so as to reflect the beam of the scanning tube upwardly through the lens 122 and toward a photo multiplier pick-up tube mounted within an enclosure 125 also secured to the cover 118.

The structural embodiment of the invention shown in FIGURES 4 and 5 is analogous to the embodiment of the system diagrammatically illustrated in FIGURE 2; and as a result, a monitor station may be provided which includes a viewing cathode ray tube and a control unit for manipulating the motors 90 and 98. Such units, however, are not shown in association with the structure of FIGURES 4 and 5 since they may be located remotely therefrom, nor is the circuitry for the various electrical components since, with respect to the present invention, such circuitry may be conventional and is appropriately indicated in FIGURE 2.

The specific system of coordinates illustrated in the drawings and described in detail with respect thereto is a Cartesian coordinate system in which, then, the coordinate axes are necessarily normal with respect to each other. The Cartesian system is most usually employed, and therefore is generally the most convenient to adopt in a practicable measuring system. However, other coordinate systems may be used; and by way of example, in certain environments a skewed system could be employed, and with such a system, should it be desired to obtain the Cartesian coordinates for any point location on an object, this can be done by simple mathematical transformations. Consequently, as respects the present invention, particular coordinate systems may be considered to be interchangeable so long as the scales or gratings are maintained relative to each other in a fixed relationship appropriately co-related to the particular system of coordinates employed.

Also, in the field of optics, ruled gratings can be either transparent or reflecting, and in use a selection is made in accordance with practical considerations. Quite evidently, the apertures of the measuring gratings shown in the drawings would be light-reflecting rather than light-transmitting should a reflecting grating be employed, and the light sources associated therewith would then be located and positioned so that the light energy therefrom would be reflected from the measuring gratings toward the reference gratings—in contrast to the specific instance illustrated in which the measuring gratings are light-transmitting and are therefore disposed intermediate the reference gratings and the light sources.

It will be apparent from the foregoing description that a coordinate measuring system formed in accordance with the present invention is operative to make coordinate measurements with very great speed and with an exceedingly great degree of accuracy—speed and accuracy heretofore being incompatible functions. In this connection, mechanical accuracy is built into a single solid transport member which can be displaced by non-precision mechanical devices at speeds limited only by coordinate counter capabilities. In that the measuring gratings are fixedly carried by such transport and may be integrally formed therewith, they are permanently maintained in a proper predetermined relationship, once provided, in which projections of the axes of the elongated apertures thereof intersect at right angles. Furthermore, as a result of the positional relationship of the various gratings and of the inspection station, sensitivity to rotation-induced errors is substantially obviated by limiting the same to the favorable cosine function, all as heretofore described.

While in the foregoing specification embodiments of the invention have been set forth in considerable detail for purposes of making an adequate disclosure thereof, it will be appreciated by those skilled in the art that numerous changes may be made in such details without departing from the spirit and principles of the invention.

We claim:

1. A device for determining the relative coordinates of two or more object points with respect to at least two intersecting axes comprising: a unitary transport providing an inspection station and being supported for controlled displacements along such axes; means for selectively displacing said transport; a pair of scales fixedly related to said transport and respectively including a plurality of measuring graduations and being disposed so that projections of the graduations of one of said scales intersect similar projections of the graduations of the other of said scales; such graduations of one of said scales being oriented for measuring displacements of said transport relative to one of said axes and the graduations of the other of said scales being oriented for measuring displacements of said transport relative to another of said axes; means for supporting at said inspection station an object having points the coordinates of which are to be determined relative to said axes; and means for inspecting such object to position any such point at a known location by appropriate displacement of said transport; the length and width of each of said scales defining an area at least as large as said inspection station so that maximum displacements of said transport in all directions of movement thereof in locating an object point are accommodated by said scales.

2. The device of claim 1, and further including means for reading each of said scales to establish the position of said transport with a particular object point at such known location and thereby determine the coordinates of such particular point.

3. A device for determining the relative Cartesian coordinates of two or more object points comprising: a unitary transport providing an inspection station and being supported for reciprocable displacements generally in the directions of two axes disposed at substantially right angles with respect to each other; means for selectively displacing said transport relative to each such axis; a pair of scales fixedly related to said transport and respectively including a plurality of measuring graduations; such graduations of one of said scales being oriented for measuring displacements of said transport along one coordinate axis and the graduations of the other of said scales being oriented for measuring displacements of said transport along another coordinate axis; means for supporting at said inspection station an object having points the coordinates of which are to be determined; and means for inspecting such object to position any such point at a known location by appropriate displacement of said transport; whereby the coordinates of any point disposed at such known location are determined by the scale positions corresponding thereto; projections of the graduations of one of said scales intersecting similar projections of the graduations of the other of said scales at right angles; whereby precise normalcy in the orientation of the axes of reciprocable displacement of said transport is not requisite in accurate coordinate determinations; the length and width of each of said scales defining an area at least as large as said inspection station so that maximum displacements of said transport in all directions of movement thereof in locating an object point are accommodated by said scales.

4. A device for determining the relative coordinates of two or more object points comprising: a unitary transport providing an inspection station and being supported for reciprocable displacements generally in the directions of two axes disposed at substantially right angles with respect to each other; means for selectively displacing said transport relative to each such axis; a pair of scales fixedly related to said transport and respectively including a plurality of measuring graduations; such graduations of one of said scales being oriented for measuring displacements of said transport along one coordinate axis and the graduations of the other of said scales being oriented for measuring displacements of said transport along another coordinate axis; means for supporting at said inspection station an object having points the coordinates of which are to be determined; and means for inspecting such object to position any such point at a known location by appropriate displacement of said transport; considering said transport as being divided into quadrants by intersecting axes respectively parallel to said coordinate axes, said scales being disposed with respect to said transport in opposite quadrants thereof and oriented so that lines which extend through the respective scale graduations and are generally normal to the respectively associated coordinate axes intersect in a third quadrant and said inspection station being disposed in the remaining quadrant; whereby the coordinates of any point disposed at such known location are determined by the scale positions corresponding thereto.

5. A device for determing the relative Cartesian coordinates of two or more object points comprising: a unitary transport providing an inspection station and being supported for reciprocable displacements generally in the directions of two axes disposed at substantially right angles with respect to each other; means for selectively displacing said transport relative to each such axis; a pair of scales fixedly related to said transport and respectively including a plurality of measuring graduations; such graduations of one of said scales being oriented for measuring displacements of said transport along one coordinate axis and the graduations of the other of said scales being oriented for measuring displacements of said transport along another coordinate axis; means for supporting at said inspection station an object having points the coordinates of which are to be determined; and means for inspecting such object to position any such point at a known location by appropriate displacement of said transport; considering said transport as being divided into quadrants by intersecting axes respectively parallel to said coordinate axes, said scales being disposed with respect to said transport in opposite quadrants thereof and oriented so that lines which extend through the respective scale graduations and are normal to the respectively associated coordinate axes intersect at right angles in a third quadrant and said inspection station being disposed in the remaining quadrant; whereby the coordinates of any point disposed at such known location are determined by the scale positions corresponding thereto; the length and width of each of said scales defining an area at least as large as said inspection station so that maximum displacements of said transport in all directions of movement thereof in locating an object point are accommodated by said scales.

6. A device for determining the relative Cartesian coordinates of two or more object points comprising: a unitary transport providing an inspection station therealong and being supported for reciprocable displacements generally in the directions of two axes disposed at substantially right angles with respect to each other; means for selectively displacing said transport relative to each such axis; a pair of gratings fixedly related to said transport and respectively including a plurality of equally spaced, longitudinally extending apertures defining measuring graduations; such graduations of one of said gratings being oriented for measuring displacements of said transport along one coordinate axis and the graduations of the other of said gratings being oriented for measuring displacements of said transport along another coordinate axis; said gratings further being oriented so that extensions of the apertures of one of said gratings all intersect extensions of the apertures of the other of said gratings at right angles; means for supporting at such inspection station an object having points the coordinates of which are to be determined; means for inspecting such object to position any such point thereof at a known location by appropriate displacement of said transport; considering said transport as being divided into quadrants by intersecting axes respectively parallel to said coordinate axes, said gratings being disposed with respect to said transport in opposite quadrants thereof with such intersection of the extensions of the apertures being in a third quadrant and said inspectiton station being disposed in the remaining quadrant; and light-responsive means for reading each of said gratings to establish the position of said transport with an object point at such known location and thereby determine the coordinates of such point.

7. The device of claim 6 in which said gratings are transmission optical gratings and said apertures thereof are light-transmitting.

8. The device of claim 6 in which the length and width of each of said gratings defines an area at least as large as said inspection station so that maximum displacements of said transport in all directions of movement thereof in locating an object point are accommodated by said gratings.

9. The coordinate measuring device of claim 6 in which a light source is provided to direct light energy toward said gratings, said light source comprising a pair of lights respectively associated with said gratings; and a pair of collimating lenses respectively associated with said lights for directing the light energy relatively uniformly toward at least a portion of the gratings respectively associated therewith.

10. A device for determining the relative coordinates of two or more object points comprising: a unitary transport providing an inspection station and being supported for reciprocable displacements generally in the directions of two axes disposed at substantially right angles with respect to each other; means for selectively displacing said transport relative to each such axis; a pair of measuring gratings fixedly related to said transport and respectively including a plurality of longitudinally extending apertures defining measuring graduations; such graduations of one of gratings being oriented for measuring displacements of said transport along one coordinate axis and the graduations of the other of said gratings being oriented for measuring displacements of said transport along another coordinate axis; means for supporting at such inspection station an object having at least two points the coordinates of which are to be determined; means for inspecting such object to position such point thereof at a known location by appropriate displacement of said transport; a pair of transmission optical reference gratings respectively disposed in juxtaposition with the aforesaid measuring gratings and each including a plurality of longitudinally extending light-transmitting apertures oriented in substantially parallel relation with the apertures of the associated measuring grating; said reference gratings being fixedly located whereby said transport and measuring gratings are movable relative thereto; and light-responsive means for reading changes in the intensity of light transmitted thereto by each associated pair of measuring and reference gratings as a consequence of the displacement of said transport to establish the position thereof with any object point at such known location and thereby determine the coordinates of such point; said measuring gratings further being oriented so that extensions of the apertures of one of the measuring gratings all intersect extensions of the apertures of the other of the measuring gratings; considering said transport as being divided into quadrants by intersecting axes respectively parallel to said coordinate axes, said measuring gratings and the reference gratings respectively associated therewith being disposed with respect to said transport in opposite quadrants thereof with such intersection of the extensions of the apertures being in a third quadrant and said inspection station being disposed in the remaining quadrant; the length and width of each of said measuring gratings defining an area sufficiently large that maximum displacements of said transport in all directions of movement thereof in locating an object point are accommodated by said measuring gratings.

11. A device for determining the relative Cartesian coordinates of two or more object points comprising: a unitary transport providing an inspection station and being supported for reciprocable displacements generally in the directions of two axes disposed at substantially right angles with respect to each other; means for selectively displacing said transport relative to each such axis; a pair of measuring gratings fixedly related to said transport and respectively including a plurality of longitudinally extending apertures defining measuring graduations; such graduations of one of said gratings being oriented for measuring displacements of said transport along one coordinate axis and the graduations of the other of said gratings being oriented for measuring displacements of said transport along another coordinate axis; means for supporting at such inspection station an object having at least two points the coordinates of which are to be determined; means for inspecting such object to position such point thereof at a known location by appropriate displacement of said transport; a pair of transmission optical reference gratings respectively disposed in juxtaposition with the aforesaid measuring gratings and each including a plurality of longitudinally extending light-transmitting apertures oriented in substantially parallel relation with the apertures of the associated measuring grating; said reference gratings being fixedly located whereby said transport and measuring gratings are movable relative thereto; and light-responsive means for reading changes in the intensity of light transmitted thereto by each associated pair of measuring and reference gratings as a consequence of the displacement of said transport to establish the position thereof with any object point at such known location and thereby determine the coordinates of such point; said measuring gratings further being oriented so that extensions of the apertures of one of the measuring gratings all intersect extensions of the apertures of the other of the measuring gratings at right angles and said reference gratings being oriented so that extensions of the apertures of one of the reference gratings all intersect extensions of the apertures of the other of the reference gratings at right angles; considering said transport as being divided into quadrants by intersecting axes respectively parallel to said coordinate axes, said measuring gratings and the reference gratings respectively associated therewith being disposed with respect to said transport in opposite quadrants thereof with such intersection of the extensions of the apertures being in a third quadrant and said inspection station being disposed in the remaining quadrant; the length and width of each of said measuring gratings defining an area sufficiently large that maximum displacements of said transport in all directions of movement thereof in locating an object point are accommodated by said measuring gratings.

12. The device of claim 11 in which said light-responsive means include photo transducer means in operative association with each pair of juxtaposed measuring and reference gratings.

13. The device of claim 11 in which a light source is provided to direct light energy toward said gratings, said light source comprising a pair of lights respectively associated with said measuring gratings; and a pair of collimating lenses respectively associated with said lights for directing the light energy therefrom relatively uniformly toward at least a portion of the measuring gratings respectively associated therewith.

14. The device of claim 11 in which the apertures of each pair of associated measuring and reference gratings are of substantially uniform width and equally spaced except that pitch faults are provided in the reference gratings of each such pair to sense the direction of relative motion between the respectively juxtaposed measuring and reference gratings along the coordinate axis associated therewith.

15. The device of claim 14 in which said pitch faults are ¼-pitch faults.

16. The device of claim 11 in which said measuring gratings are transmission optical gratings and said apertures thereof are light-transmitting.

17. The device of claim 11 in which the aforesaid means for inspecting such object includes a flying spot scanning system, light-responsive photoelectric transducer means for collecting the light transmitted by said scanning system, and electric viewing means connected with said transducer means for reproducing an image of the object area scanned by said scanning system.

18. A device for determining the relative coordinates of two or more object points comprising: a transport providing an inspection station and being supported for controlled displacements; a pair of scales respectively including a plurality of measuring graduations; such graduations of one of said scales being oriented for measuring displacements of said transport in one direction and the graduations of the other of said scales being oriented to measure displacements of said transport in another direction; means for supporting at said inspection station an object having points the coordinates of which are to be determined; and means for inspecting such object to position such point at a known location by appropriate displacement of said transport, whereby the coordinates of any point disposed at such known location are determined by the scale positions corresponding thereto; considering said transport as being divided into quadrants by intersecting axes, said scales being disposed with respect to said transport in opposite quadrants thereof and oriented so that lines which extend through the respective scale graduations intersect in a third quadrant and said inspection station being disposed in the remaining quadrant.

19. The device of claim 18 in which said one and another directions of displacement of said transport are along orthogonal axes and the aforesaid transport-dividing intersecting axes are respectively parallel thereto; and in which the lines extending through the scale graduations are respectively parallel to such axes and intersect at right angles in such third quadrant.

20. The device of claim 19 in which said scales comprise measuring gratings with the measuring graduations thereof being longitudinally extending apertures; and in which said device is further provided with a pair of transmission optical reference gratings respectively disposed in juxtaposition with the aforesaid measuring gratings and each including a plurality of longitudinally extending light-transmitting apertures oriented in substantially parallel relation with the apertures of the associated measuring grating; said reference gratings and measuring gratings being relatively movable upon displacements of said transport.

21. A device for determining the relative coordinates of two or more object points comprising: a unitary transport providing an inspection station and being supported for reciprocable displacements generally in the directions of two coordinate axes disposed at substantially right angles with respect to each other; means for selectively displacing said transport relative to each such axis; a pair of measuring gratings fixedly related to said transport and respectively including a plurality of longitudinally extending apertures defining measuring graduations; such graduations of one of said gratings being oriented for measuring displacements of said transport along one coordinate axis and the graduations of the other of said gratings being oriented for measuring displacements of said transport along the other coordinate axis; means for supporting at said inspection station an object having at least two points the coordinates of which are to be determined;

means for inspecting such object to position such point at a known location by appropriate displacement of said transport; a pair of transmission optical reference gratings respectively disposed in juxtaposition with the aforesaid measuring gratings and each including a plurality of longitudinally extending light-transmitting apertures oriented in substantially parallel relation with the apertures of the associated measuring gratings; said reference gratings being fixedly located whereby said transport and measuring gratings are movable relative thereto; and light-responsive means for reading changes in the intensity of the light transmitted thereto by each associated pair of measuring and reference gratings as a consequence of the displacement of said transport to establish the position thereof with any object point at such known location and thereby determine the coordinates of such point; said measuring gratings being so oriented that projections of the graduations of one of said measuring gratings intersect similar projections of the graduations of the other of said measuring gratings at substantially right angles; and the length and width of each of said measuring gratings being sufficiently great to define an area at least as large as said inspection station so that maximum displacements in all directions of movement thereof in locating an object point are accommodated by said measuring gratings.

References Cited
UNITED STATES PATENTS

| | | | |
|---|---|---|---|
| 3,114,046 | 12/1963 | Cabaniss et al. | 250—237 |
| 3,184,600 | 5/1965 | Potter | 250—237 |
| 3,227,888 | 1/1966 | Shepherd et al. | 250—237 |

RALPH G. NILSON, *Primary Examiner.*

ARCHIE R. BORCHELT, *Examiner.*

M. A. LEAVITT, *Assistant Examiner.*